United States Patent
Robertson et al.

(10) Patent No.: US 8,233,709 B2
(45) Date of Patent: Jul. 31, 2012

(54) COLOR EFFECTS FOR COMPRESSED DIGITAL VIDEO

(75) Inventors: Mark A. Robertson, Cupertino, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 817 days.

(21) Appl. No.: 12/399,214

(22) Filed: Mar. 6, 2009

(65) Prior Publication Data

US 2010/0226567 A1    Sep. 9, 2010

(51) Int. Cl.
 *G06K 9/36* (2006.01)
(52) U.S. Cl. ......... 382/166; 382/162; 382/232; 382/233
(58) Field of Classification Search ........... 382/162, 382/274, 232, 233, 166, 167; 84/612; 700/131; 358/1.9; 348/578, 650; 345/594, 589; 428/195.1, 428/91; 715/202
See application file for complete search history.

(56) References Cited

U.S. PATENT DOCUMENTS

| | | | | |
|---|---|---|---|---|
| 4,777,779 | A * | 10/1988 | Lodge et al. | 53/115 |
| 5,227,863 | A * | 7/1993 | Bilbrey et al. | 348/578 |
| 5,907,776 | A * | 5/1999 | Hshieh et al. | 438/270 |
| 5,911,669 | A * | 6/1999 | Stentz et al. | 56/10.2 F |
| 6,249,547 | B1 | 6/2001 | Boyce et al. | |
| 6,298,166 | B1 | 10/2001 | Ratnakar et al. | |
| 6,477,276 | B1 * | 11/2002 | Inoue et al. | 382/232 |
| 6,697,061 | B1 | 2/2004 | Wee et al. | |
| 6,931,070 | B2 | 8/2005 | Moore | |
| 7,885,460 | B2 * | 2/2011 | Ubillos et al. | 382/167 |
| 2006/0285819 | A1 | 12/2006 | Kelly et al. | |

OTHER PUBLICATIONS

Susie J. Wee and Bhaskaran Vasudev, "Compressed-Domain Reverse Play of MPEG Video Streams", SPIE International Symposiam on Voice, Video and Data Communications, Boston MA, Nov. 1998, Hewlett-Packard Laboratories, Palo Alto ,CA, Epson Palo Alto Laboratory, Palo Alto, CA.

Farshid Arman, Arding Hsu and Ming-Yee Chiu, "Image Processing on Compressed Data for Large Video Databases", Proceedings of the First ACM International Conference on Multimedia, Aug. 1993, Anaheim, CA.

W.A.C. Fernando, C.N. Canagarajah, D.R. Bull, "Video Special Effects Editing in MPEG-2 Compressed Video", Proceedings of the 2000 IEEE International Symposium on Circuits and Systems, vol. 2, pp. 281-284, 2000.

* cited by examiner

*Primary Examiner* — Anh Hong Do

(74) *Attorney, Agent, or Firm* — Havestock & Owens LLP

(57) ABSTRACT

Implementing color effects in compressed digital video is improved upon by re-using the original video's compression parameters during the re-encoding stage, such that the parameters do not need to be re-estimated by the encoder. This improved method reduces complexity and also improves quality. Quality is improved due to re-use of the compression parameters since accumulated error which is common when re-encoding compressed video is prevented. For digital negatives, the effect is able to be implemented even more efficiently.

27 Claims, 4 Drawing Sheets

COLOR EFFECTS FOR COMPRESSED DIGITAL VIDEO

FIELD OF THE INVENTION

The present invention relates to the field of video processing. More specifically, the present invention relates to implementing color effects for compressed digital video.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability over a simple subtraction approach. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

MPEG is used for the generic coding of moving pictures and associated audio and creates a compressed video bit-stream made up of a series of three types of encoded data frames. The three types of data frames are an intra frame (called an I-frame or I-picture), a bi-directional predicted frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Besides MPEG standards, JPEG is used for the generic coding of still pictures. Since the encoding of a still picture can be considered as the encoding of an I frame in video, no introduction of JPEG will be provided here. There are some other proprietary methods for image/video compression. Most of them adopt similar technologies as MPEG and JPEG. Basically, each picture is separated into one luminance (Y) and two chrominance channels (also called color difference signals Cb and Cr). Blocks of the luminance and chrominance arrays are organized into "macroblocks," which are the basic unit of coding within a frame. Block based transformation and quantization of transform coefficients are used to achieve high compression efficiency.

Since quantization is a lossy process, the combination of block-based transform and quantization is able to generate perceptually annoying artifacts such as ringing artifacts and blocking artifacts. Since coding artifact reduction is fundamental to many image processing applications, it has been investigated for many years. Many post-processing methods have been proposed. In general, most methods focus on blocking artifacts reduction or ringing artifacts reduction. Although some methods show good results on selected applications, the quality is not high enough on new digital HDTV. As a result, either the artifacts are still visible or the texture detail is blurred.

SUMMARY OF THE INVENTION

Implementing color effects in compressed digital video is improved upon by re-using the original video's compression parameters during the re-encoding stage, such that the parameters do not need to be re-estimated by the encoder. This improved method reduces complexity and also improves quality. Quality is improved due to re-use of the compression parameters since accumulated error which is common when re-encoding compressed video is prevented. For digital negatives, the effect is able to be implemented even more efficiently.

In one aspect, a method of applying a color effect to a compressed video implemented on a computing device comprises decoding a compressed video into a decoded compressed video, applying a color effect to the decoded compressed video and re-using information from the compressed video to encode the decoded compressed video. A user selects the color effect to apply to the compressed video using a graphical user interface. Alternatively, the color effect is applied automatically. The compressed video is an MPEG-2 video. Alternatively, the compressed video is an Advanced Video Coding (AVC) video. The information includes at least one of intra spatial prediction modes, transform coefficients, transform size, a quantization parameter, a segmentation of sub-blocks for motion compensation, motion vectors and reference pictures for the motion vectors. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of generating a digital negative of a compressed video using a computing device comprises accessing the compressed video and changing the sign of transform coefficients of each I-picture and subsequent P- and B-pictures of the compressed video. The compressed video is an MPEG-2 video. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of generating a digital negative of a compressed video using a computing device comprises applying the digital negative to each pixel of decoded intra macroblocks, re-encoding the intra-coded macroblocks using original compression parameters, negating each of a second set of transform coefficients of inter-coded macroblocks and re-encoding the inter-coded macroblocks using a portion of the original compression parameters. The compressed video is an Advanced Video Coding (AVC) video. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In yet another aspect, a system for applying a color effect to a compressed video implemented with a computing device comprises a decoding module configured for decoding a compressed video into a decoded compressed video, a color effects module operatively coupled to the decoding module, the color effects module configured for applying a color effect to the decoded compressed video and an encoding module operatively coupled to the color effects module, the encoding module configured for encoding the decoded compressed video re-using information from the compressed video. A user selects the color effect to apply to the compressed video using a graphical user interface. Alternatively, the color effect is applied automatically. The compressed video is an MPEG-2 video. Alternatively, the compressed video is an Advanced Video Coding (AVC) video. The information includes at least one of intra spatial prediction modes, transform coefficients, transform size, a quantization parameter, a segmentation of sub-blocks for motion compensation, motion vectors and reference pictures for the motion vectors. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application configured for decoding a compressed video into a decoded compressed video, applying a color effect to the decoded compressed video and re-using information from the compressed video to encode the decoded compressed video and a processing component coupled to the memory, the processing component configured for processing the application. A user selects the color effect to apply to the compressed video using a graphical user interface. Alternatively, the color effect is applied automatically. The compressed video is an MPEG-2 video. Alternatively, the compressed video is an Advanced Video Coding (AVC) video. The information includes at least one of intra spatial prediction modes, transform coefficients, transform size, a quantization parameter, a segmentation of sub-blocks for motion compensation, motion vectors and reference pictures for the motion vectors. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

DETAILED DESCRIPTION OF THE PREFERRED EMBODIMENT

Instead of a cascaded implementation of color effects, an improved method both in simplicity and quality is described herein. Cascaded implementations fully decode existing compressed video, then apply the effect in the pixel domain, then re-encode the video, where each of these three is performed independently of each other. The improved method achieves lower complexity by re-using information available in the original compressed video when re-encoding the video with the color effect. Better quality is achieved in a similar manner, by re-using information from the original compressed video to minimize generational losses of multiple encodings. The method is able to be applied to any video compression standard, although MPEG-4/AVC (Advanced Video Coding) and MPEG-2 are discussed herein.

Figure 1:
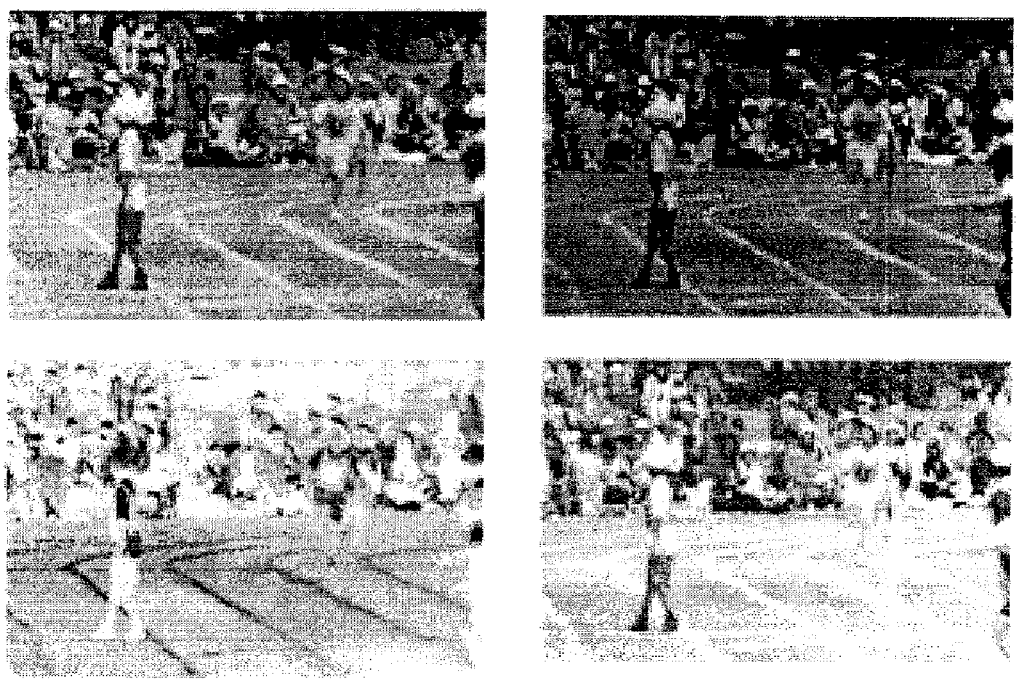
FIG. 1 illustrates example images with color effects applied.

FIG. 1 illustrates examples of effects that are useful to a consumer who is editing digital video clips, where the top-left picture is the original picture. The examples are limited to the intensity component of the video, to accommodate limitations of the printing medium. There are numerous other examples that are able to be considered, especially when more than just the intensity is processed.

One common feature of these color effects is that they are point operators, such that the color of the output pixel at location and time (x, y, t) is a function of the color of the input pixel at location and time (x, y, t), without reference to any other pixels. This is able to be written as:

$$I'(x,y,t) = f(I(x,y,t))$$

where $I(x, y, t) \in R^3$ is the input color at $(x, y)$ and time $t$, $I'(x, y, t) \in R^3$ is the output color at pixel position $(x, y)$ and time $t$, and the function $f(\ ): R^3 \rightarrow R^3$ maps input colors to output colors. Note: it is assumed the colors are specified by three numbers. Although the numbers are specified with real numbers, in practice they are integers in [0, 255].

Figure 2:
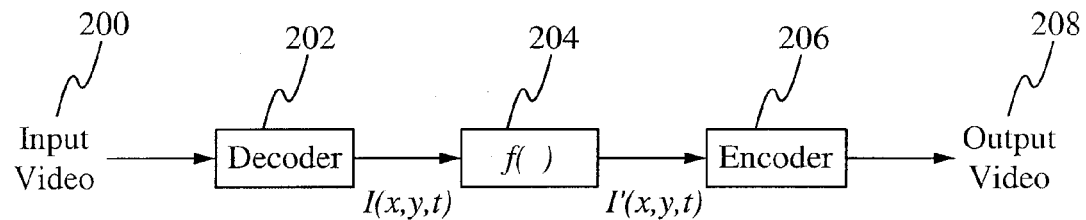
FIG. 2 illustrates a block diagram of a cascaded implementation of color effects applied to a compressed video.

It is assumed that the source content is available in a compressed format (for example, AVC or MPEG-2), and that the destination content will be the same format. A cascaded implementation of the color effect would decode the video, apply the color effect in the pixel domain, and re-encode the video, as shown in FIG. 2. In the cascaded implementation, an input video 200 is decoded by a decoder 202. Then, an effect/function 204 is applied. An encoder 206 encodes the video with the applied effect which results in an output video 208. Execution of the final encoding stage is the most costly in terms of computational complexity. The final stage is also the source of generational loss, which is the quality loss that occurs when a compressed signal is decompressed and re-compressed.

General Approach for Color Effects in Compressed Video

For operators $f(\ )$ that are useful for color effects, the underlying structure of the output image is the same as that of the input image. In other words, edges remain edges, textures remain textures and their locations and orientations are unchanged. Object motion is the same, camera motion is the same and occlusion and uncovering of objects are unchanged. The appearance is different, for that is the reason of the color effect. However, the underlying video characteristics remain intact.

In its compressed form, the original video includes a succinct representation of the video pixels. Depending on the particular compression standard, the compressed video representation is able to include motion information (motion vectors), texture information (transform coefficients) and edge and contour information (intra spatial prediction). Many of these elements of the original compressed video representation are equally valid for the output compressed video.

Important to achieving both complexity reduction and quality improvement is to re-use information from the original compressed video when generating the output compressed video. In particular, some or all of the following (depending on the effect) are re-used when re-encoding to form the output sequence:

1. Intra spatial prediction modes. For example, horizontal, vertical or DC prediction mode; 4×4 or 16×16.

2. Transform coefficients and transform size. For example, the 4×4 or 8×8 DCT coefficients.

3. Quantization parameter.

4. Segmentation of sub-blocks for motion compensation. For example, 8×4 or 8×16 blocks.

5. Reference pictures for each motion vector, including if the prediction is list0, list1 or bi-prediction.

6. Motion vectors. For example (−3, 3¼).

In some cases, it is also beneficial to consider some of the above information when implementing the effect $f(\ )$.

Not having to re-estimate the above information dramatically reduces the complexity of the encoding of the output sequence.

Below are two examples of color effects to be applied to a video.

Chroma Effects

Some useful effects are able to be applied strictly to the chroma planes, without any changes to the luma plane. An example is the sepia effect, one realization of which is able to be achieved by setting the entire (Cb, Cr) chroma planes to (108, 148). Another example is conversion to gray scale, which is able to be realized by setting the entire (Cb, Cr) chroma planes to (128, 128). Any chroma pair is able to be considered, depending on the desired color.

For chroma effects, the luma plane should be re-encoded in exactly the same manner as it is originally encoded. In the case of MPEG-2, this results in using many of the same bits (variable length codes) as were present in the original compressed video. In the case of AVC, which uses context adaptation and possibly binary arithmetic coding, it is unlikely that bits are able to be re-used directly. However, by using all of the same information (as mentioned in the numbered list above), the luma plane is able to be represented by the output video such that there is no quality loss relative to the original compressed representation.

Coding the new chroma planes is straightforward since each is uniformly a single value. By making sure that all predictors (both spatial and temporal) are set to the desired values, all chroma transform coefficients are able to be set to zero. Thus, only the few macroblocks that determine the predictors are explicitly coded with the desired (Cb, Cr) pair, while the remainder of the macroblocks are able to leave the chroma components un-coded.

Brightness and Contrast

Brightness and contrast are practical operations that are useful for users of video editing software. When generating output compressed video (after applying the effect), the information from the original compressed video is re-used.

One approach to adjust brightness and contrast is to modify only the luma plane, leaving the chroma planes untouched. Such an approach allows a chroma representation in the output video that has no loss relative to the original compressed video, in much the same manner as was possible for the luma plane described in Chroma Effects above.

Since the luma plane is being intentionally changed by the effect, it is not possible to make the output compressed luma lossless relative to the input compressed luma. Indeed, there will be generational loss due to the re-encoding. If many generations of the brightness/contrast adjustments are made, visual quality appears to worsen. However, by using the same compression parameters as in the original input, the generational losses will be much less than would be the case for the cascaded implementation.

Digital Negatives

Digital negatives are an example effect that allows a special implementation. An example of a digital negative is shown in the left column of FIG. 1, where the top is the original picture, and the bottom has digital negative applied to the luma plane. Applying the digital negative to the luma-chroma color representation of the data gives an effect that is different than the negative that one sees with physical film. With physical film, the red, green and blue color channels each appear negated. However, one is able to negate only the luma to get the interesting effect of inverted brightness, with chromaticity relatively unchanged. For example, the sky stays blue and grass stays green, but the brightness of the sky and grass will be inverted.

The definition of a digital negative for one color component is:

$$\text{output}=255-\text{input}.$$

When considering the generic way that compressed video data is formed by a decoder, when no predictions are available (for example, the first macroblock of an intra slice in AVC), the prediction is equal to 128, $$\text{out}_1 = 128 + \text{residual}$$

By negating the residual:

$$out_2 = 128 + (-\text{residual})$$
$$= 256 - out_1$$

Thus, for this macroblock that has no prediction available, the digital negative is approximately formed by negating the prediction residual. It is approximate because there is an offset of +1. In the more general case, predictions are available and the output is formed as $$\text{out}_3=\text{prediction}+\text{residual}$$

However, if the prediction term has had the digital negative applied, and if the sign of the residual is changed:

$$out_4 = (256 - \text{prediction}) + (-\text{residual})$$
$$= 256 - (\text{prediction} + \text{residual})$$
$$= 256 - out_3$$

Again, the digital negative is formed by negating the prediction residual.

For the case of MPEG-2, the digital negative for a color plane is able to be implemented by applying the above logic directly: starting with an I-picture and continuing with subsequent P- and B-pictures, change the sign of every transform coefficient. Such a procedure is able to be applied directly to the compressed bits by identifying the variable length codes that correspond to transform coefficients and changing the sign bits. For those coefficients that are represented with Escape Codes, the transform coefficients are represented with a fixed-length two's complement format, and negation requires that the two's complement is applied to the fixed-length field.

The digital negative is not implemented as simply in AVC as for the case of MPEG-2. If the same approach is attempted, small error drift (due to differences in rounding) is able to lead to unacceptable artifacts. These artifacts are most pronounced in I-pictures. To use a similar approach as for MPEG-2, the intra-coded macroblocks need to be treated specially. If the intra-coded blocks have the digital negative applied to their decoded pixels, and then the blocks are re-encoded using the original compression parameters, then drift error is compensated. With the intra macroblocks correctly processed, the MPEG-2 approach is able to be applied to the inter-coded macroblocks. Each transform coefficient of inter-coded macroblocks is negated, and all of the same compression parameters are re-used. Such an approach prevents unacceptable artifacts from occurring for digital negatives in AVC.

Figure 3:
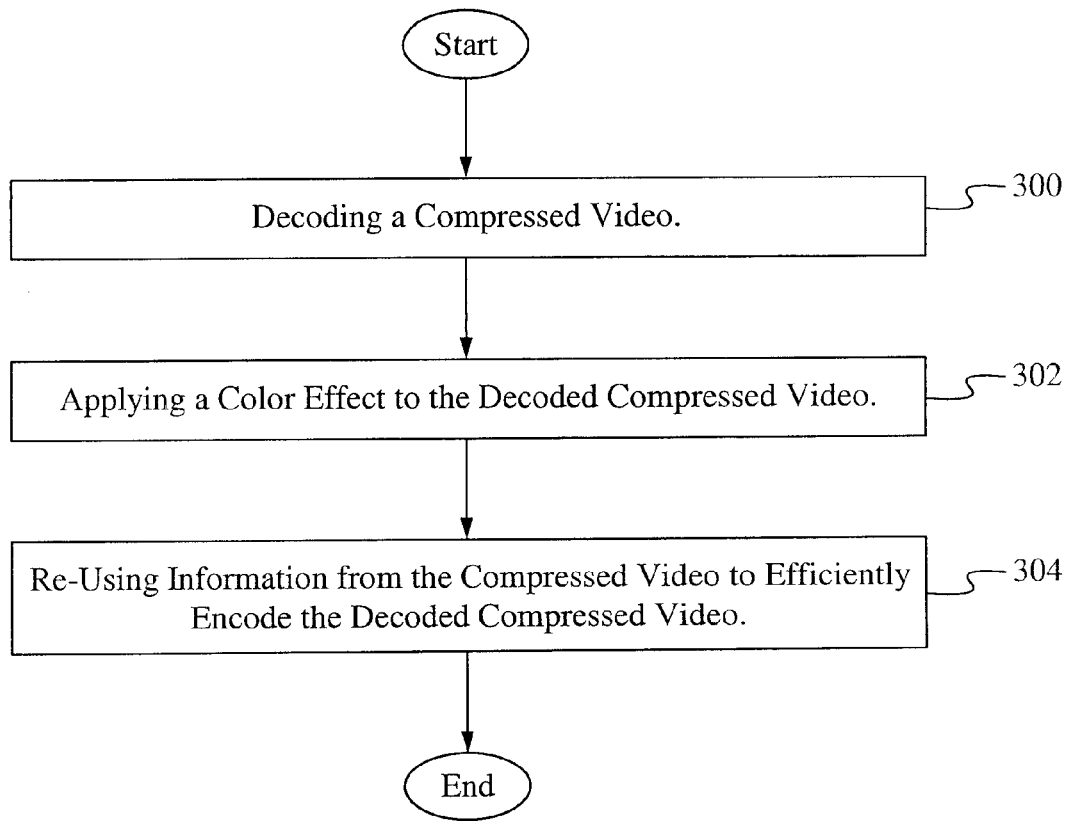
FIG. 3 illustrates a flowchart of a method of improved color effects.

FIG. 3 illustrates a flowchart of an improved method of applying a color effect to compressed video. In the step 300, a compressed video is decoded. The compressed video is decoded according to the compression scheme used to compress the video originally. Decoding a video is well known in the art. In the step 302, a color effect is applied to the decoded compressed video. The color effect is able to be any color effect including, but not limited to, brightness, contrast and many other color effects. In the step 304, the decoded compressed video is encoded by re-using information from the original compressed video. As described above, the information to be re-used includes, but is not limited to, intra spatial prediction modes, transform coefficients and transform size, a quantization parameter, segmentation of sub-blocks for motion compensation, reference pictures for each motion vector and motion vectors.

Figure 4:
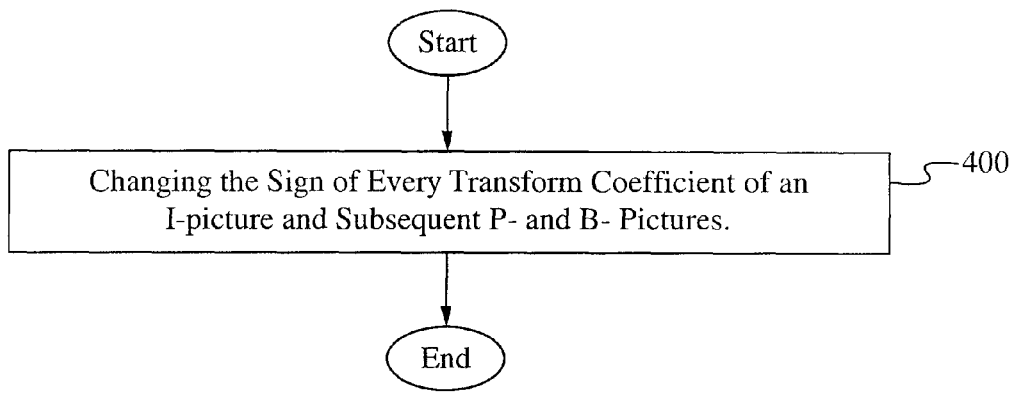
FIG. 4 illustrates a flowchart of a method of applying a digital negative to an MPEG-2 compressed video.

FIG. 4 illustrates a flowchart of a method of generating a digital negative of an MPEG-2 or similar video. In the step 400, the sign of each transform coefficient of an I-picture and subsequent P- and B-pictures is changed as described above. By changing the sign of each transform coefficient, a digital negative of the video is generated.

Figure 5:
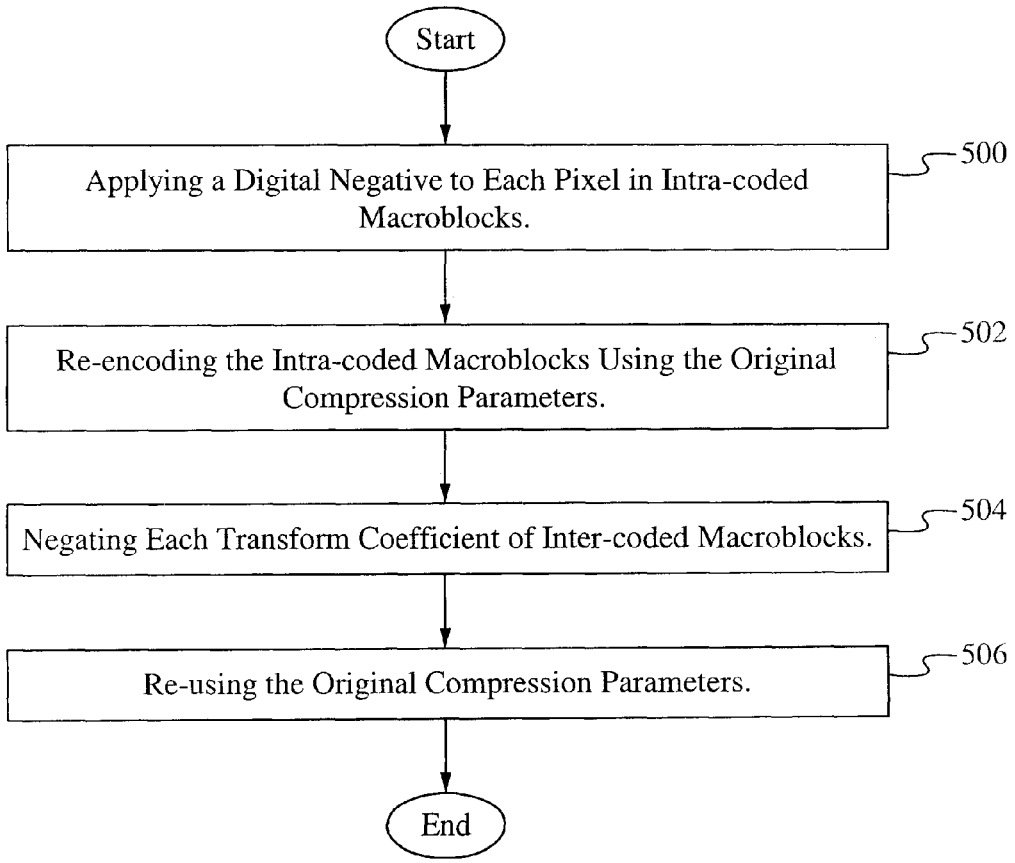
FIG. 5 illustrates a flowchart of a method of applying a digital negative to an AVC compressed video.

FIG. 5 illustrates a flowchart of a method of generating a digital negative of an AVC or similar video. In the step 500, a digital negative is applied to each pixel in intra-coded macroblocks. Applying the digital negative possibly includes changing the sign of the transform coefficients of an I-picture. In some embodiments, a negation is applied in the pixel domain (on decoded pixels) for the intra-coded macroblocks. In the step 502, the intra-coded macroblocks are re-encoded using the original compression parameters. In the step 504, each transform coefficient of the inter-coded macroblocks is negated. A portion of the original compression parameters are re-used in encoding the video, in the step 506.

Figure 6:
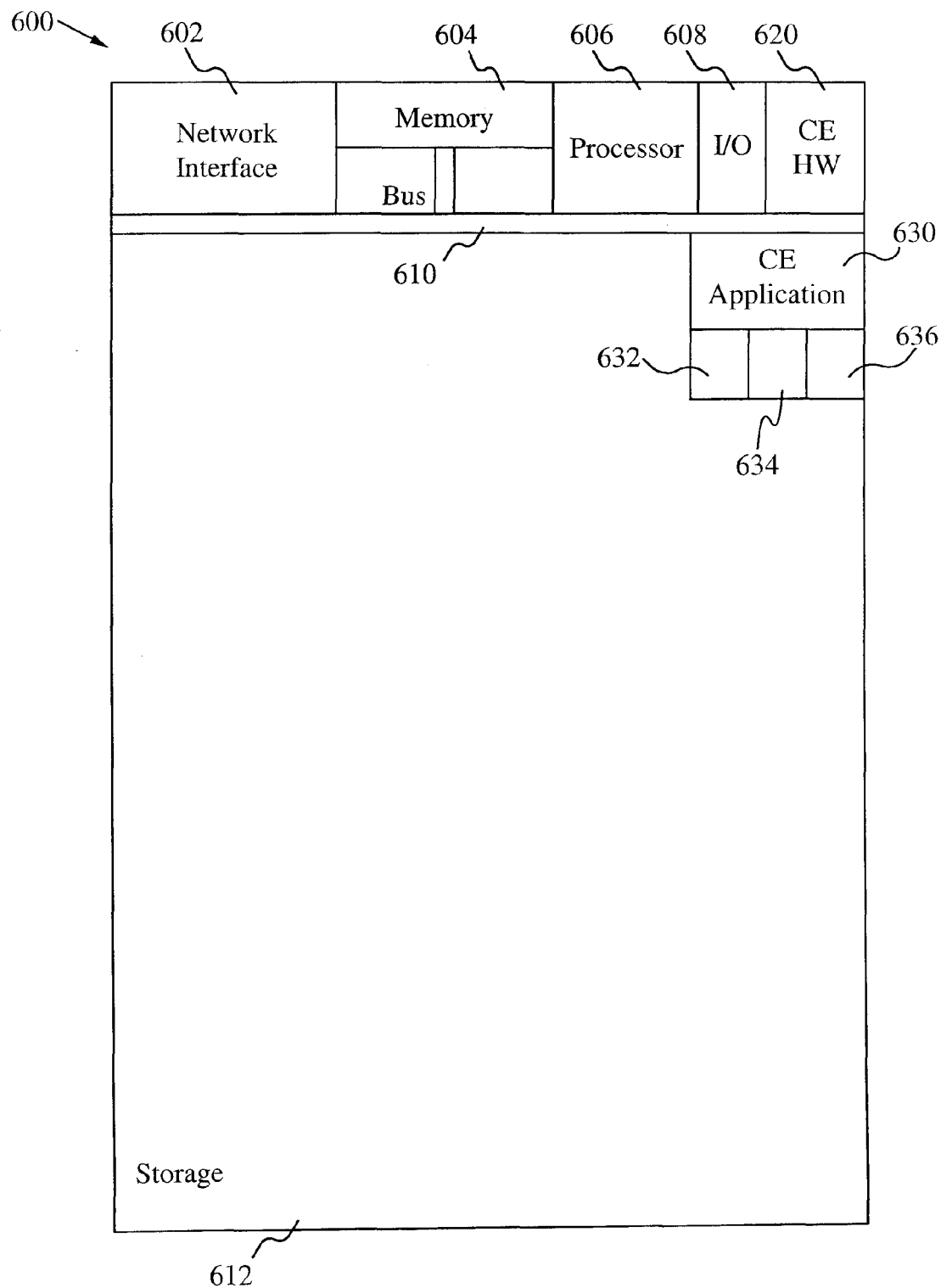
FIG. 6 illustrates a block diagram of an exemplary computing device configured to implement the improved method of color effects.

FIG. 6 illustrates a block diagram of an exemplary computing device 600 configured to implement the improved color effects method. The computing device 600 is able to be used to acquire, store, compute, communicate and/or display information such as images and videos. For example, a computing device 600 has an image or a video stored within, and then the improved color effects method is able to alter the video as desired but in a more efficient manner and with better quality than previous methods. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, display, printer, modem, touchscreen, button interface and other devices. Color effects application(s) 630 used to perform the improved color effects method are likely to be stored in the storage device 612 and memory 604 and processed as applications are typically processed. More or less components shown in FIG. 6 are able to be included in the computing device 600. In some embodiments, color effects hardware 620 is included. Although the computing device 600 in FIG. 6 includes applications 630 and hardware 620 for color effects, the improved color effect method is able to be implemented on a computing device in hardware, firmware, software or any combination thereof.

In some embodiments, the color effects application(s) 630 include several applications and/or modules. In some embodiments, the color effects application(s) 630 include a decoding module 632, a color effects module 634 and an encoding module 636.

As described above, the decoding module 632 decodes a compressed video so that the color effects are able to be applied to the video. The color effects module 634 applies one or more color effects to the video. In some embodiments, a user selects the color effect to apply to the video using a graphical user interface. In some embodiments, the color effects are applied automatically. The encoding module 636 encodes the decoded compressed video. The encoding module 636 re-uses information from the original compressed video for efficiency and accuracy.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

To utilize the improved color effects method, a computing device is used to manipulate the compressed video. In some embodiments, via a user interface, a user is able to select which color effect to apply. For example, if a user chooses to brighten a video, he is able to select a brighten tab or equivalent, and the brighten effect is applied to the video. In some embodiments, an application is configured to automatically apply certain color effects. For example, an application within a digital camcorder is able to automatically correct lighting issues with a color effects application and/or hardware installed.

In operation, the improved color effects method is able to more efficiently and more accurately apply a color effect to a compressed video by re-using information from the originally compressed video. By re-using the information, the time to encode the compressed video is shortened since all of the data does not need to be encoded. Furthermore, re-using the information also avoids propagating errors that are able to develop during the encoding process. A specific color effect, a digital negative effect, is able to be applied very efficiently by changing the sign of every transform coefficient of an I-picture and subsequent P- and B-pictures, when dealing with MPEG-2 videos. For AVC videos, additional steps are taken, but again, the process is very efficient.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of applying a color effect to a compressed video implemented on a computing device, the method comprising:
   a. decoding a compressed video into a decoded compressed video;
   b. applying a color effect to the decoded compressed video; and
   c. re-using information from the compressed video to encode the decoded compressed video.

2. The method of claim 1 wherein a user selects the color effect to apply to the compressed video using a graphical user interface.

3. The method of claim 1 wherein the color effect is applied automatically.

4. The method of claim 1 wherein the compressed video is an MPEG-2 video.

5. The method of claim 1 wherein the compressed video is an Advanced Video Coding (AVC) video.

6. The method of claim 1 wherein the information includes at least one of intra spatial prediction modes, transform coefficients, transform size, a quantization parameter, a segmentation of sub-blocks for motion compensation, motion vectors and reference pictures for the motion vectors.

7. The method of claim 1 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

8. A method of generating a digital negative of a compressed video using a computing device, the method comprising:
   a. accessing the compressed video; and
   b. changing the sign of transform coefficients of each I-picture and subsequent P- and B-pictures of the compressed video.

9. The method of claim 8 wherein the compressed video is an MPEG-2 video.

10. The method of claim 8 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

11. A method of generating a digital negative of a compressed video using a computing device, the method comprising:
   a. applying the digital negative to each pixel of decoded intra macroblocks;
   b. re-encoding the intra-coded macroblocks using original compression parameters;
   c. negating each of a second set of transform coefficients of inter-coded macroblocks; and
   d. re-encoding the inter-coded macroblocks using a portion of the original compression parameters.

12. The method of claim 11 wherein the compressed video is an Advanced Video Coding (AVC) video.

13. The method of claim 11 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

14. A system for applying a color effect to a compressed video implemented with a computing device comprising:
   a. a decoding module configured for decoding a compressed video into a decoded compressed video;
   b. a color effects module operatively coupled to the decoding module, the color effects module configured for applying a color effect to the decoded compressed video; and
   c. an encoding module operatively coupled to the color effects module, the encoding module configured for encoding the decoded compressed video re-using information from the compressed video.

15. The system of claim 14 wherein a user selects the color effect to apply to the compressed video using a graphical user interface.

16. The system of claim 14 wherein the color effect is applied automatically.

17. The system of claim 14 wherein the compressed video is an MPEG-2 video.

18. The system of claim 14 wherein the compressed video is an Advanced Video Coding (AVC) video.

19. The system of claim 14 wherein the information includes at least one of intra spatial prediction modes, transform coefficients, transform size, a quantization parameter, a segmentation of sub-blocks for motion compensation, motion vectors and reference pictures for the motion vectors.

20. The system of claim 14 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

21. A device comprising:
a. a memory for storing an application, the application configured for:
   i. decoding a compressed video into a decoded compressed video;
   ii. applying a color effect to the decoded compressed video; and
   iii. re-using information from the compressed video to encode the decoded compressed video; and
b. a processing component coupled to the memory, the processing component configured for processing the application.

22. The device of claim 21 wherein a user selects the color effect to apply to the compressed video using a graphical user interface.

23. The device of claim 21 wherein the color effect is applied automatically.

24. The device of claim 21 wherein the compressed video is an MPEG-2 video.

25. The device of claim 21 wherein the compressed video is an Advanced Video Coding (AVC) video.

26. The device of claim 21 wherein the information includes at least one of intra spatial prediction modes, transform coefficients, transform size, a quantization parameter, a segmentation of sub-blocks for motion compensation, motion vectors and reference pictures for the motion vectors.

27. The device of claim 21 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

* * * * *